US011890238B2

(12) United States Patent
Diodato et al.

(10) Patent No.: US 11,890,238 B2
(45) Date of Patent: Feb. 6, 2024

(54) ARMBOARD ASSEMBLIES FOR SUPPORTING AND POSITIONING A LIMB RELATIVE TO A MOUNTING STRUCTURE

(71) Applicant: Allen Medical Systems, Inc., Batesville, IN (US)

(72) Inventors: Michael Diodato, Batesville, IN (US); Zachary Bradford Konsin, Batesville, IN (US); Hung D. Nguyen, Batesville, IN (US)

(73) Assignee: Allen Medical Systems, Inc., Batesville, IN (US)

( * ) Notice: Subject to any disclaimer, the term of this patent is extended or adjusted under 35 U.S.C. 154(b) by 127 days.

(21) Appl. No.: 17/539,482

(22) Filed: Dec. 1, 2021

(65) Prior Publication Data

US 2022/0192910 A1 Jun. 23, 2022

Related U.S. Application Data

(60) Provisional application No. 63/129,153, filed on Dec. 22, 2020.

(51) Int. Cl.
*A61G 13/12* (2006.01)

(52) U.S. Cl.
CPC ...... *A61G 13/1235* (2013.01); *A61G 2210/50* (2013.01)

(58) Field of Classification Search
CPC .................................................. A61G 13/1235
(Continued)

(56) References Cited

U.S. PATENT DOCUMENTS 3,227,440 A 1/1966 Scott
4,698,837 A 10/1987 Van Steenburg
(Continued)

FOREIGN PATENT DOCUMENTS

CN 210301529 U 4/2020
GB 1256977 A 12/1971
GB 2410289 B 6/2008

OTHER PUBLICATIONS

Meditek Armboards, "https://www.youtube.com/watch?v=rYRE0sMHQjM" May 2017 (Year: 2017).*
(Continued)

*Primary Examiner* — Justin C Mikowski
*Assistant Examiner* — Adam C Ortiz
(74) *Attorney, Agent, or Firm* — Dinsmore & Shohl LLP

(57) ABSTRACT

An armboard assembly includes an armboard deck including a cavity formed in a lower surface of the armboard deck, an armboard mount including a plurality of radially extending teeth positioned within a mount portion of the cavity, and an engagement assembly movable relative to the armboard deck between an engaged position to engage the plurality of teeth of the armboard mount and a disengaged position to disengage the plurality of teeth of the armboard mount. The engagement assembly includes a handle including one or more legs extending from an upper surface of the handle, which engage an insertion hole formed in the armboard deck and a channel extending from the insertion hole toward the armboard mount, and an indexing member positioned within the cavity of the armboard deck and coupled to the handle. The indexing member limits movement of the engagement assembly by maintaining the legs within the channel.

20 Claims, 12 Drawing Sheets

(58) Field of Classification Search
USPC .............................................................. 5/646
See application file for complete search history.

(56) References Cited

U.S. PATENT DOCUMENTS

| | | | | |
|---|---|---|---|---|
| 5,135,210 | A | 8/1992 | Michelson | |
| 5,940,912 | A * | 8/1999 | Keselman .......... | A61G 13/1235 5/646 |
| 6,663,055 | B2 | 12/2003 | Boucher et al. | |
| 7,127,756 | B2 | 10/2006 | Brophy et al. | |
| 7,322,060 | B2 | 1/2008 | Kirn | |
| 7,603,731 | B2 | 10/2009 | Bradcovich | |
| 9,636,268 | B1 | 5/2017 | Bedillion | |
| 2019/0216665 | A1 | 7/2019 | Miller et al. | |
| 2020/0022861 | A1 | 1/2020 | Miller et al. | |

OTHER PUBLICATIONS

Schuremed, Standard Armboard, https://www.schuremed.com/_resources/documents/product/065-0047%20Standard%20Armboard%20REV%202.03.pdf on Oct. 5, 2020, 1 pg, Schuerch Corporation, #65-0047 REV 2.03.
Skytron, Table Accessory Guide, https://www.skytron.com/wp-content/uploads/documentation/Table-Accessories-Brochure-Web.pdf on Oct. 5, 2020, 40 pgs.
Extended European Search Report for European Application No. 21216103.8-1113, dated May 23, 2022, 7 pages.

* cited by examiner

ARMBOARD ASSEMBLIES FOR SUPPORTING AND POSITIONING A LIMB RELATIVE TO A MOUNTING STRUCTURE

CROSS-REFERENCE TO RELATED APPLICATION

This application is a non-provisional application and claims priority to U.S. Provisional Patent Application No. 63/129,153, filed Dec. 22, 2020, for "Armboard Assemblies For Supporting And Positioning A Limb Relative To A Mounting Structure," which is hereby incorporated by reference in its entirety including the drawings.

TECHNICAL FIELD

The present specification generally relates to armboard assemblies for supporting and positioning a limb of a user relative to a mounting structure, and, more specifically, armboard assemblies attachable to a mounting structure and positionable between an engaged position and a disengaged position to prohibit and permit rotation of the armboard assemblies relative to the mounting structure, respectively.

BACKGROUND

It is known to provide a limb-supporting structure, such as an armboard assembly, that may be movably attached to a mounting structure such as, for example, a surgical table or an X-ray table. Such a mounting structure typically has standardized side rails for receiving the armboard assembly.

Conventional armboard assemblies may include an armboard deck for supporting an arm during a medical procedure. However, handles of conventional armboard assemblies are not ergonomically formed to receive a hand of an operator to position the engagement assembly into the disengaged position. Further, armboard mounts of conventional armboard assemblies may permit debris from entering the armboard assemblies and are typically formed from multiple components, thereby increasing production time and cost.

Accordingly, a need exists for improved armboard assemblies that reduce the difficulty disengaging an armboard deck of an armboard assembly and prevent debris from entering the armboard assembly, while also reducing the time and cost of manufacturing.

SUMMARY

A first aspect A1 includes an armboard assembly comprising: an armboard deck comprising a cavity formed in a lower surface of the armboard deck; an armboard mount comprising a plurality of radially extending teeth positioned within a mount portion of the cavity; and an engagement assembly movable relative to the armboard deck between an engaged position to engage the plurality of teeth of the armboard mount and a disengaged position to disengage the plurality of teeth of the armboard mount, the engagement assembly comprising: a handle including one or more legs extending from an upper surface of the handle, the one or more legs slidably engaging a leg recess formed in the armboard deck, the leg recess including an insertion hole and a channel extending from the insertion hole toward the armboard mount; and an indexing member positioned within the cavity of the armboard deck and coupled to the handle, wherein the indexing member limits movement of the engagement assembly toward the disengaged position such that the one or more legs of the handle is maintained within the channel of the leg recess and does not extend into the insertion hole.

A second aspect A2 includes the armboard assembly of A1, wherein a length of travel of the indexing member in the cavity is less than or equal to a length of the channel.

A third aspect A3 includes the armboard assembly of any of A1-A2, wherein the one or more legs of the handle comprises: a vertical wall extending from the upper surface of the handle; and a horizontal wall extending from an end of the vertical wall opposite the upper surface of the handle, wherein a gap is defined between the upper surface of the handle and a lower surface of the horizontal wall.

A fourth aspect A4 includes the armboard assembly of any of A1-A3, wherein the handle further comprises: a plurality of legs extending from the upper surface of the handle, each of the plurality of legs being received within a corresponding leg recess formed in the lower surface of the armboard deck.

A fifth aspect A5 includes the armboard assembly of any of A1-A4, further comprising: a blade including a first end portion engaging the indexing member and an opposite second end portion secured to the upper surface of the handle, the blade positioned within the cavity of the armboard deck.

A sixth aspect A6 includes the armboard assembly of any of A1-A5, wherein the armboard mount further comprises: a base plate positioned on the lower surface of the armboard deck; and a wheel extending from an upper surface of the base plate, the wheel including the plurality of teeth, wherein the base plate and the wheel form a one-piece, monolithic structure.

A seventh aspect A7 includes the armboard assembly of any of A1-A6, wherein the armboard deck further comprises: a first limiting wall; and a second limiting wall, wherein the indexing member contacts the first limiting wall when the engagement assembly is in the engaged position and the indexing member contacts the second limiting wall when the engagement assembly is in the disengaged position to limit movement of the indexing member within the cavity between the engaged position and the disengaged position.

An eighth aspect A8 includes the armboard assembly of any of A1-A7, further comprising: a biasing member positioned within the cavity, the biasing member extending between the indexing member and a transverse wall to bias the indexing member toward the mount portion of the cavity.

A ninth aspect A9 includes the armboard assembly of any of A1-A8, further comprising: a third limiting wall extending from the lower surface of the armboard deck and at least partially across the cavity.

A tenth aspect A10 includes an armboard assembly comprising: an armboard deck including a cavity formed in a lower surface of the armboard deck; an armboard mount including a plurality of radially extending teeth positioned within a mount portion of the cavity; and an engagement assembly movable relative to the armboard deck between an engaged position to engage the plurality of teeth of the armboard mount and a disengaged position to disengage the plurality of teeth of the armboard mount, the engagement assembly comprising: a handle slidably movable along the lower surface of the armboard deck; a blade including a first end portion and an opposite second end portion attached to the handle, the blade positioned within the cavity; and an indexing member positioned within the cavity of the armboard deck, the first end portion of the blade engaging the indexing member.

An eleventh aspect A11 includes the armboard assembly of A10, wherein: the handle comprises one or more posts extending from an upper surface of the handle; and the first end portion of the blade comprises one or more holes formed therein, each of the one or more holes configured to receive a corresponding post of the handle.

A twelfth aspect A12 includes the armboard assembly of any of A10-A11, wherein each of the one or more holes comprises a plurality of radially outwardly extending relief slots.

A thirteenth aspect A13 includes the armboard assembly of any of A10-A12, wherein the indexing member comprises one or more legs, the first end portion of the blade received within an area at least partially defined by the one or more legs of the indexing member.

A fourteenth aspect A14 includes the armboard assembly of any of A10-A13, further comprising a biasing member positioned within the cavity, the biasing member extending between the indexing member and a transverse wall within the cavity to bias the indexing member toward the mount portion of the cavity.

A fifteenth aspect A15 includes the armboard assembly of any of A10-A14, further comprising a blade cap positioned at the lower surface of the armboard deck to conceal the blade and the indexing member within the cavity of the armboard deck.

A sixteenth aspect A16 includes a method for operating an armboard assembly, the method comprising: biasing an engagement assembly in a first direction toward an engaged position relative to an armboard deck such that an indexing member of the engagement assembly engages a plurality of teeth of an armboard mount provided within a cavity of the armboard deck; pulling a handle of the engagement assembly to move the engagement assembly in an opposite second direction toward a disengaged position such that the indexing member disengages the plurality of teeth of the armboard mount, the handle comprising one or more legs extending into a corresponding leg recess formed in the armboard deck, the leg recess including an insertion hole and a channel extending from the insertion hole toward the armboard mount; and limiting, by the indexing member, a distance in which the handle may be pulled in the second direction toward the disengaged position to maintain the one or more legs of the handle within the channel of the leg recess and prevent the one or more legs of the handle from extending into the insertion hole.

A seventeenth aspect A17 includes the method of A16, wherein the biasing the engagement assembly toward the first direction comprises expanding a biasing member between the indexing member and a transverse wall formed in the cavity.

An eighteenth aspect A18 includes the method of any of A16-A17, wherein the pulling the handle causes the biasing member to compress between the indexing member and the transverse wall.

A nineteenth aspect A19 includes the method of any one of A16-A18, wherein: a lower surface of the armboard deck is received within a gap defined by the lower surface of the armboard deck and a horizontal wall of the one or more legs of the handle extending within the armboard deck; and the armboard deck slides within the gap as the engagement assembly moves between the engaged position and the disengaged position.

A twentieth aspect A20 includes the method of any of A16-A19, wherein the armboard mount comprises: a base plate positioned on a lower surface of the armboard deck; and a wheel including the plurality of teeth, wherein the base plate and the plurality of teeth form a one-piece, monolithic structure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
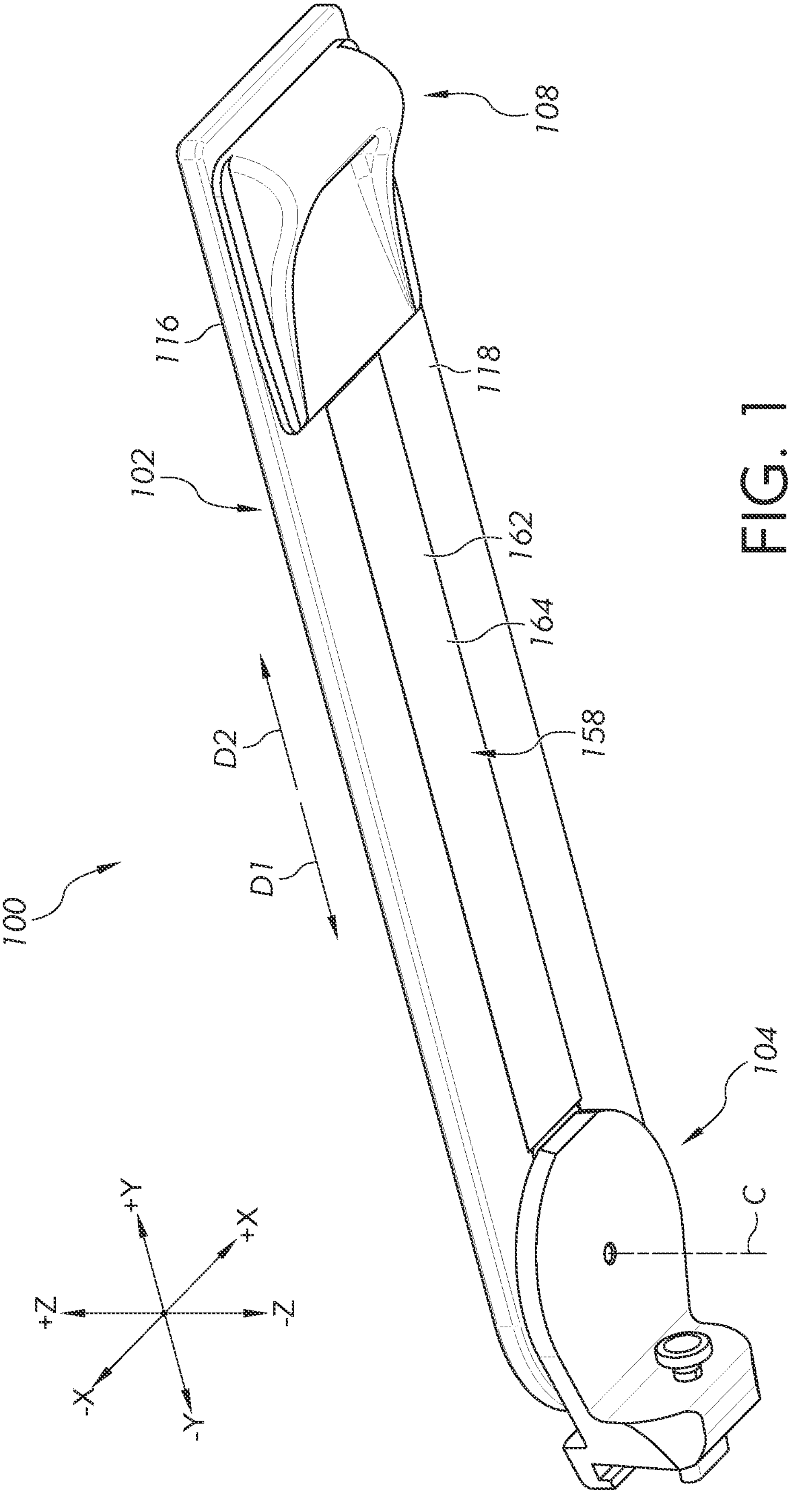
FIG. 1 schematically depicts a bottom perspective view of an armboard assembly, according to one or more embodiments shown and described herein.

Embodiments described herein are directed to armboard assemblies and methods for operating armboard assemblies that support and position a limb during a medical procedure.

In embodiments, the armboard assemblies may include an armboard deck including a cavity formed in a lower surface of the armboard deck, an armboard mount including a plurality of radially extending teeth positioned within a mount portion of the cavity, and an engagement assembly movable relative to the armboard deck between an engaged position to engage the plurality of teeth of the armboard mount and a disengaged position to disengage the plurality of teeth of the armboard mount. Various embodiments of the armboard assemblies and the operation of the armboard assemblies are described in more detail herein. Whenever possible, the same reference numerals will be used throughout the drawings to refer to the same or like parts.

Directional terms as used herein—for example up, down, right, left, front, back, top, bottom—are made only with reference to the figures as drawn and are not intended to imply absolute orientation.

As used herein, "width" refers a distance extending in the +/−X-axis, "length" refers to a distance extending in the +/−Y-axis, and "thickness" refers to a distance extending in the +/−Z-axis of the coordinate axes depicted in the drawings.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 2:
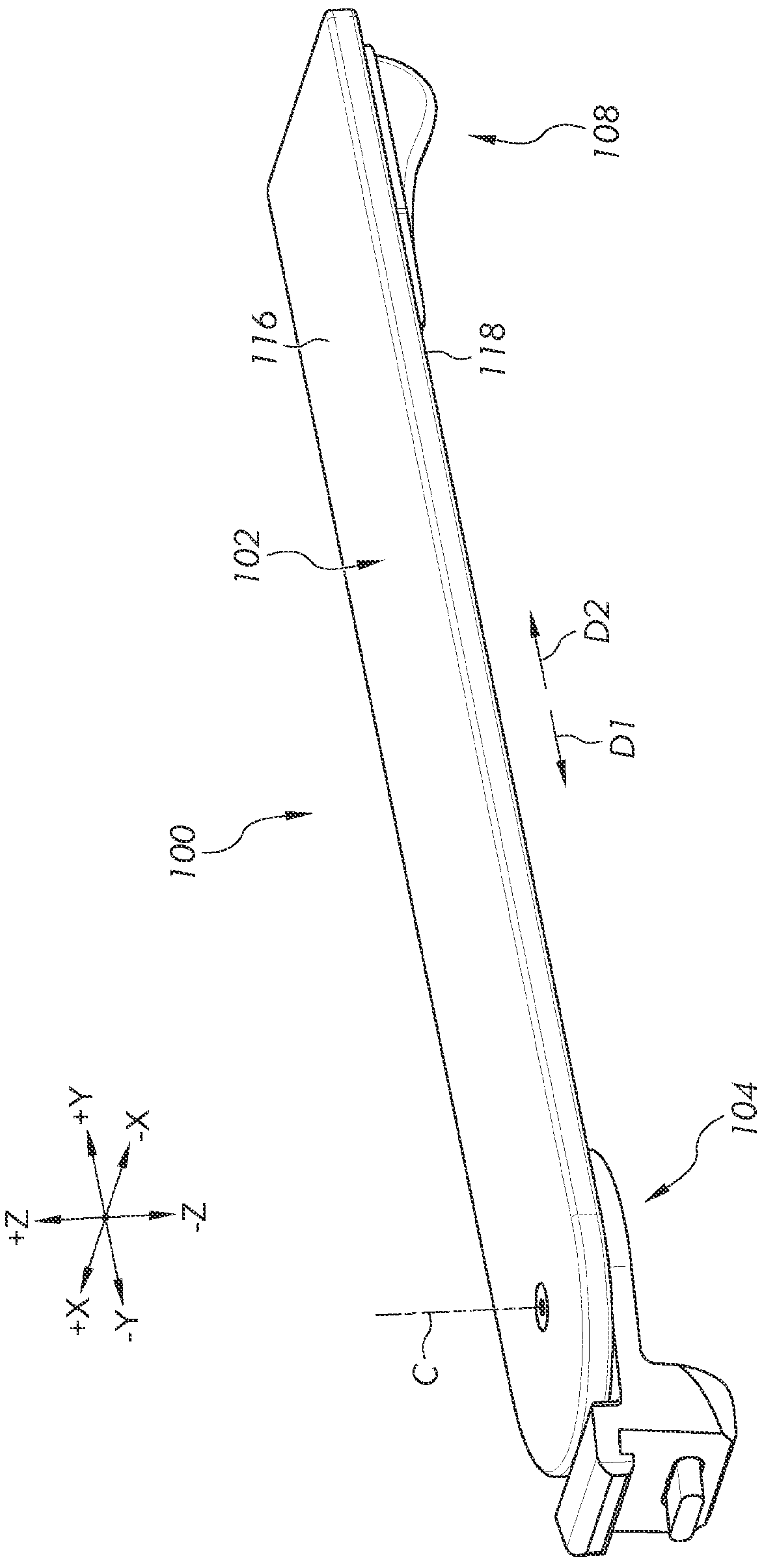
FIG. 2 schematically depicts a top perspective view of the armboard assembly, according to one or more embodiments shown and described herein.
Figure 3A:
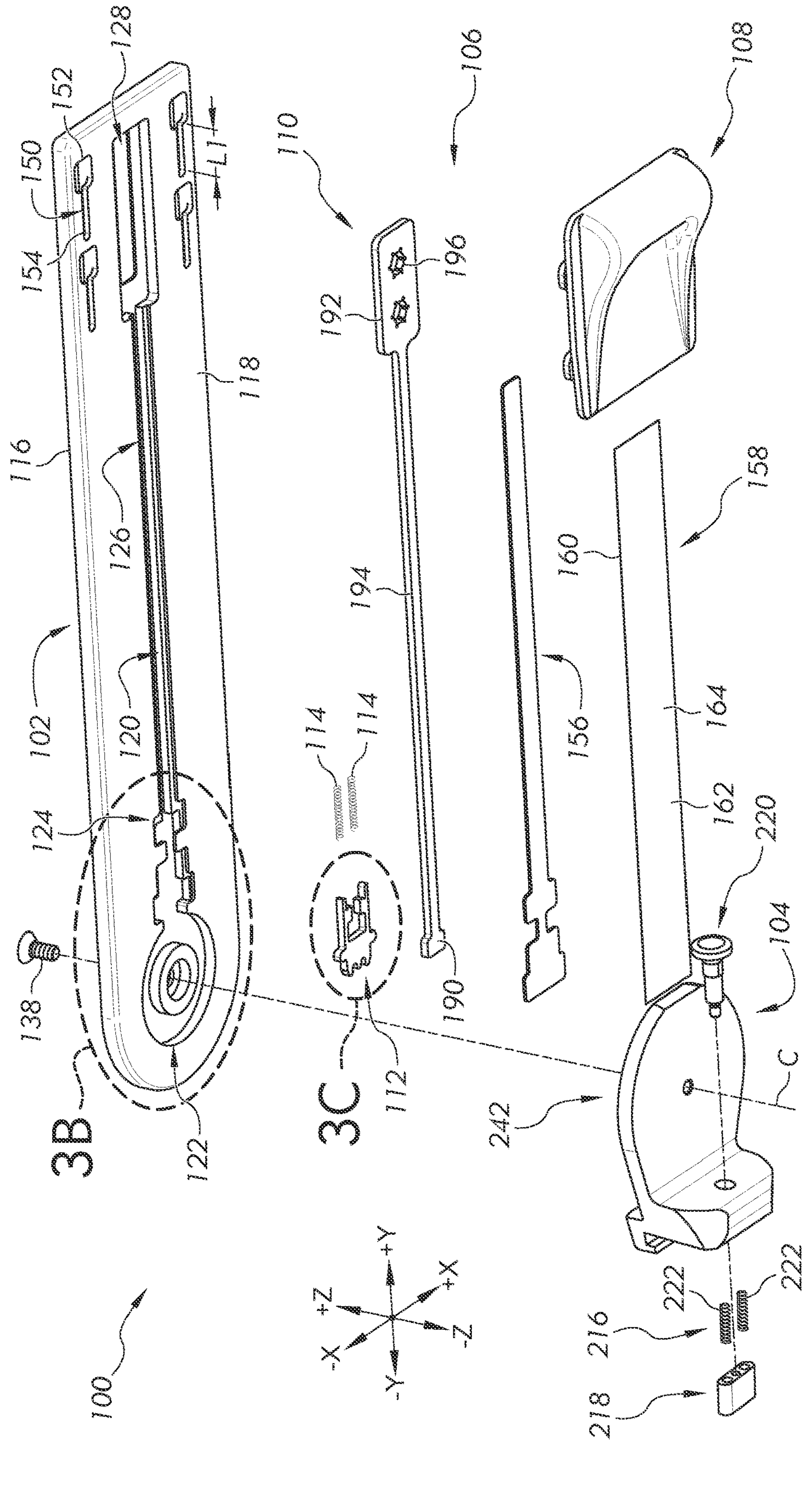
FIG. 3A schematically depicts an exploded perspective view of the armboard assembly, according to one or more embodiments shown and described herein.

Referring now to FIGS. 1, 2, and 3A, an armboard assembly 100 is illustrated according to one or more embodiments described herein. The armboard assembly 100 may generally include an armboard deck 102, an armboard mount 104 at least partially positionable within the armboard deck 102 and rotatably attached thereto, and an engagement assembly 106. The engagement assembly 106 is movable relative to the armboard deck 102 in a first direction D1 into an engaged position (FIG. 13) and in an opposite second direction D2 into a disengaged position (FIG. 14). As discussed in more detail herein, when the engagement assembly 106 is in the engaged position, the engagement assembly 106 engages the armboard mount 104 and prevents rotation of the armboard deck 102 relative to the armboard mount 104, and when the engagement assembly 106 is in the disengaged position, the engagement assembly 106 does not engage the armboard mount 104 and, thus, permits rotation of the armboard deck 102 relative to the armboard mount 104. The engagement assembly 106 includes a handle 108, a blade 110, an indexing member 112, and at least one biasing member 114 for biasing the engagement assembly 106 in the first direction D1 and into the engaged position.

Referring still to FIGS. 1, 2, and 3A, the armboard deck 102 includes an upper surface 116 and an opposite lower surface 118. A cavity 120 is formed in the lower surface 118 of the armboard deck 102 and extends toward the upper surface 116. The cavity 120 includes a mount portion 122, an indexing portion 124 open to the mount portion 122, an elongated portion 126 open to the indexing portion 124, and an end portion 128 opposite the mount portion 122 and open to the elongated portion 126. As discussed herein, the armboard mount 104 is partially received within the mount portion 122, the indexing member 112 is received within the indexing portion 124, and the blade 110 is received within the indexing portion 124, the elongated portion 126, and the end portion 128.

Figure 3C:
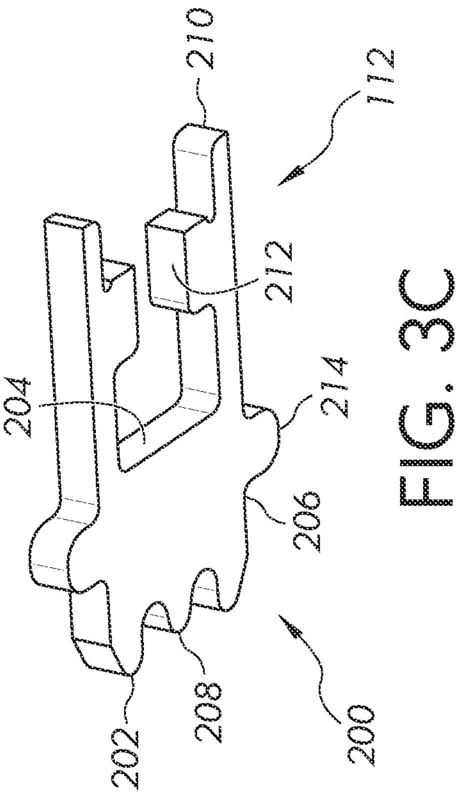
FIG. 3C schematically depicts an enlarged perspective view of circle 3C of FIG. 3A showing an indexing member of the armboard assembly, according to one or more embodiments shown and described herein.
Figure 3B:
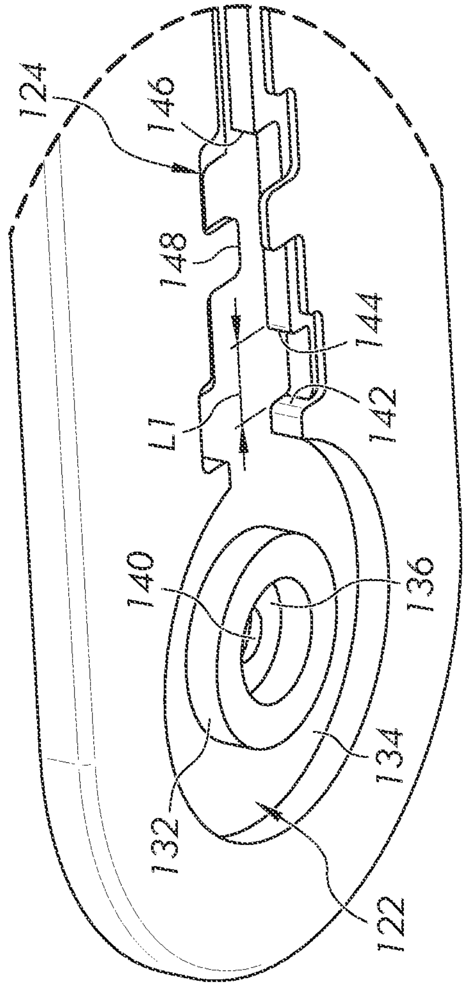
FIG. 3B schematically depicts an enlarged perspective view of circle 3B of FIG. 3A showing a mount portion of a cavity of the armboard assembly, according to one or more embodiments shown and described herein.
Figure 4:
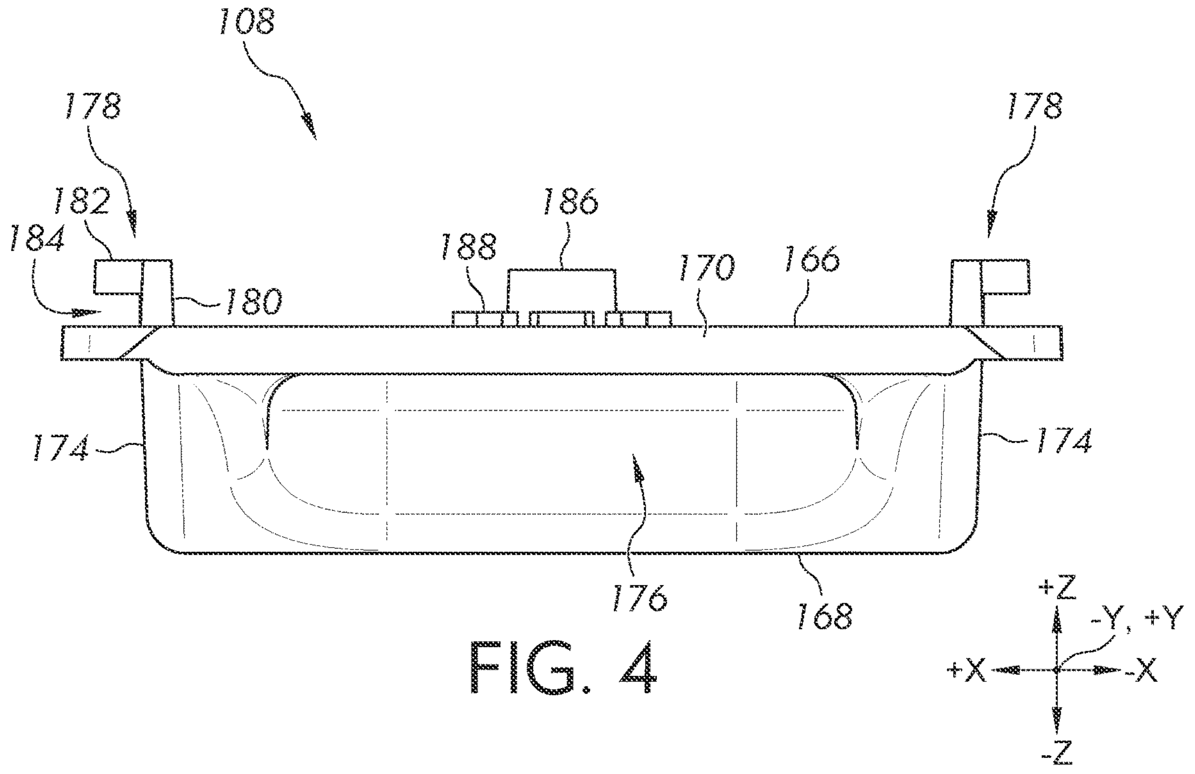
FIG. 4 schematically depicts a front elevation view of a handle of the armboard assembly, according to one or more embodiments shown and described herein.
Figure 5:
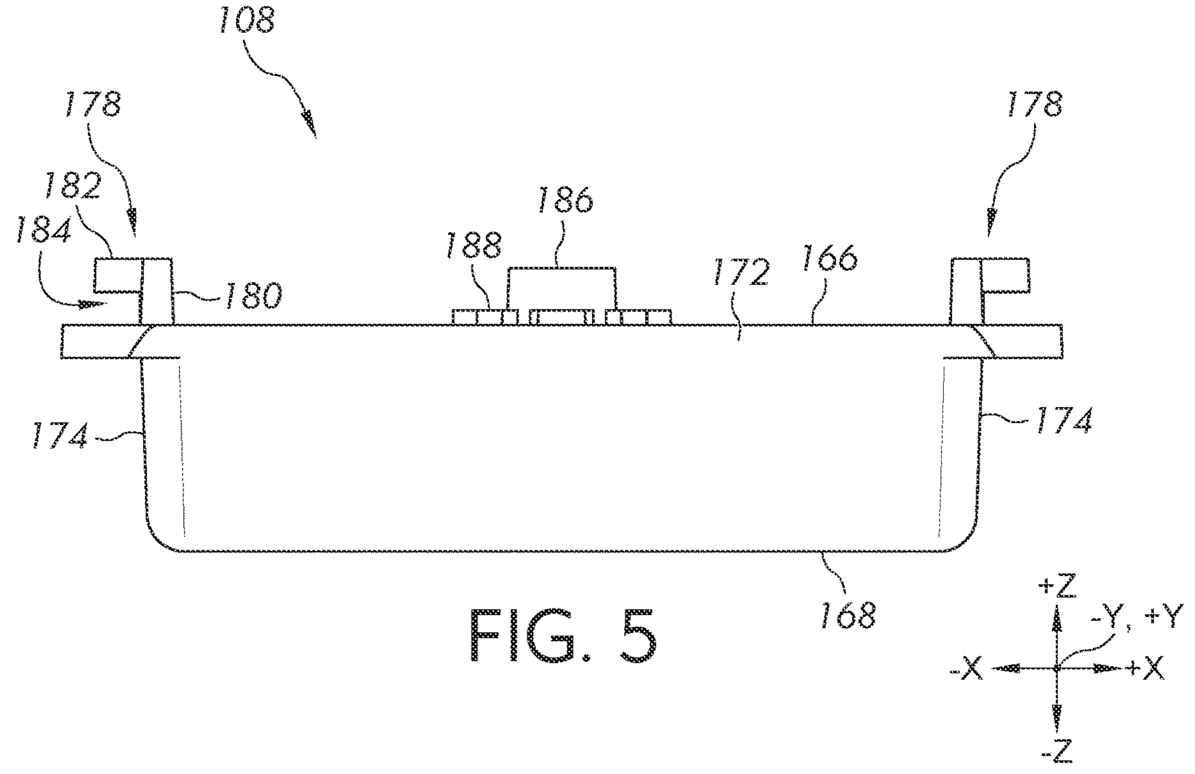
FIG. 5 schematically depicts a rear elevation view of the handle, according to one or more embodiments shown and described herein.
Figure 6:
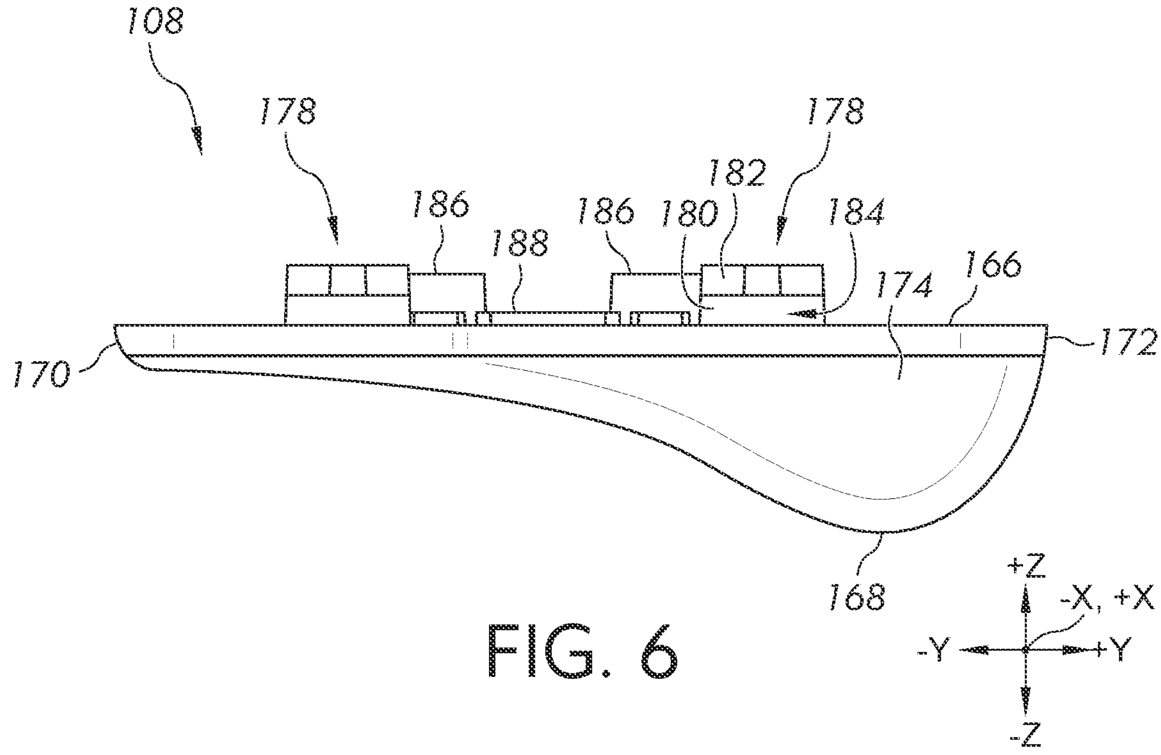
FIG. 6 schematically depicts a side elevation view of the handle, according to one or more embodiments shown and described herein.
Figure 7:
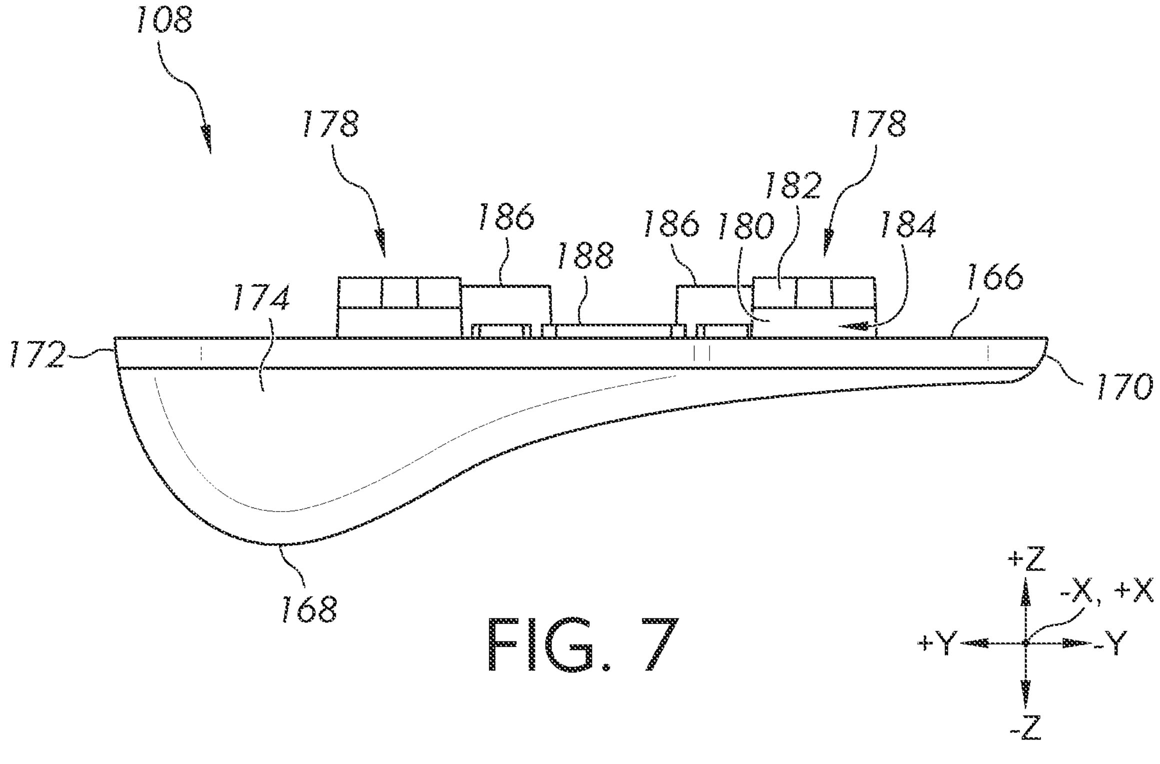
FIG. 7 schematically depicts an opposite side elevation view of the handle, according to one or more embodiments shown and described herein.

As shown in FIG. 3B, the mount portion 122 of the cavity 120 includes an axially extending ring 132 separating an outer receiving area 134 from an inner receiving area 136. A fastener 138 such as, for example, a screw, is provided to extend through an aperture 140 formed in the inner receiving area 136 and engage the armboard mount 104 to rotatably secure the armboard mount 104 within the mount portion 122 of the cavity 120. In embodiments, the fastener 138 may extend from the upper surface 116 of the armboard deck 102, specifically through the inner receiving area 136, and toward the armboard mount 104 partially positioned within the mount portion 122 of the cavity 120 to threadably engage the armboard mount 104. In other embodiments, the fastener 138 may extend through the armboard mount 104 and through the lower surface 118 of the armboard deck 102, specifically the inner receiving area 136, to threadably engage the armboard deck 102. The armboard mount 104 is described in more detail herein.

The indexing portion 124 of the cavity 120 formed in the armboard deck 102 defines a first limiting wall 142 and a second limiting wall 144 extending from one side of the indexing portion 124 toward an opposite side of the indexing portion 124. As discussed in more detail herein, in embodiments, the first limiting wall 142 and the second limiting wall 144 define an indexing length L1 in which the engagement assembly 106 is permitted to move, i.e., a length of travel, between the engaged position and the disengaged position. The indexing portion 124 of the cavity 120 also defines a transverse wall 146 extending from one side of the indexing portion 124 toward the opposite side of the indexing portion 124. In embodiments, the transverse wall 146 is provided at an end of the indexing portion 124 opposite first limiting wall 142. The transverse wall 146 defines a reduced width of the indexing portion 124 from which the elongated portion 126 of the cavity 120 extends. As shown in FIG. 3B, the first limiting wall 142, the second limiting wall 144, and the transverse wall 146 each extends from opposite sides of the indexing portion 124 toward a central portion thereof. In embodiments, a third limiting wall 148 extends from the lower surface 118 of the armboard deck 102 at the indexing portion 124 of the cavity 120 and at least partially across the indexing portion 124. As shown, the third limiting wall 148 may extend from both sides of the indexing portion 124 of the cavity 120 toward a central portion thereof. The third limiting wall 148 restricts unintentional removal of components positioned within the indexing portion 124 of the cavity 120.

The elongated portion 126 of the cavity 120 extends from the indexing portion 124, specifically from the transverse wall 146, to the end portion 128 of the cavity 120. In embodiments, the elongated portion 126 has a width less than a width of the end portion 128.

Referring again to FIG. 3A, one or more leg recesses 150 are formed in the lower surface 118 of the armboard deck 102. As shown, a plurality of leg recesses 150 are shown on opposite sides of the end portion 128 of the cavity 120. Each leg recess 150 includes an insertion hole 152 and a channel 154 having a channel length L2 extending from the insertion hole 152 toward the mount portion 122 of the cavity 120. When a plurality of leg recesses 150 are provided, each of the channels 154 extend parallel to one another. As shown, the channel 154 has a width less than a width of the insertion hole 152. Although not shown, a hollow space is provided within the armboard deck 102 between the lower surface 118 of the armboard deck 102 defining the channel 154 and the upper surface 116 of the armboard deck 102. As described in more detail herein, this allows a portion of the handle 108 to engage the armboard deck 102 and slidably move along the channel 154 in the first direction D1 and the second direction D2.

As shown in FIG. 3A, a blade cap 156 may be provided to conceal the indexing member 112 and the blade 110 positioned within the cavity 120 of the armboard deck 102 and prevents debris from entering the cavity 120. In embodiments, a securement strip 158 is provided over the blade cap 156. The securement strip 158 may include an adhesive backing surface 160 to secure to the blade cap 156 and an opposite surface 162 including attachment means 164 such as, for example, hook and loop fasteners, for securing an attachment device such as, for example, a restraint strap (not shown). In embodiments, the attachment device may be configured to wrap around the armboard deck 102 and around a limb, such as an arm, of a subject positioned on the upper surface 116 of the armboard deck 102, thereby securing the limb to the armboard deck 102 during rotation of the armboard deck 102 relative to the armboard mount 104.

It should be appreciated that at least the armboard deck 102 and the engagement assembly 106 are constructed so as to be generally transparent or translucent (i.e., radiolucent) to X-rays through its thickness. Accordingly, the armboard deck 102 and the engagement assembly 106 are constructed from material that is generally transparent or translucent to X-rays such as, for example, polyethylene or polypropylene.

Referring now to FIGS. 4-9, the handle 108 includes an upper surface 166, an opposite lower surface 168, a front end 170, a rear end 172, and a pair of side walls 174 extending between the upper surface 166 and the lower surface 168 and between the front end 170 and the rear end 172. A height of the side walls 174 extending between the upper surface 166 and the lower surface 168 is greater at the rear end 172 than at the front end 170. An indentation 176 is formed in the lower surface 168 closer to the rear end 172 than the front end 170 to define a grip. The grip is configured to receive one or more fingers of a user to facilitate pulling the engagement assembly 106 in the second direction D2 to transition the engagement assembly 106 out of the engaged position and into the disengaged position.

The handle 108 includes one or more legs 178 extending from the upper surface 166 of the handle 108 to engage a corresponding leg recess 150 formed in the armboard deck 102. As shown, a plurality of legs 178 extend from the upper surface 166 of the handle 108 with each leg 178 fitting within a corresponding leg recess 150 formed in the armboard deck 102. Each leg 178 includes a vertical wall 180 extending from the upper surface 166 of the handle 108 and a horizontal wall 182 extending from an end of the vertical wall 180 opposite the upper surface 166 of the handle 108. In embodiments, the horizontal wall 182 extends in a direction opposite a center of the upper surface 166 of the handle 108. In other embodiments, the horizontal wall 182 extends in a direction toward the center of the upper surface 166 of the handle 108. A gap 184 is defined between the upper surface 166 of the handle 108 and a lower surface of the horizontal wall 182. Specifically, the horizontal wall 182 of the leg 178 has a width less than the width of the insertion hole 152 of the leg recess 150 such that the horizontal wall 182 is able to extend through the insertion hole 152, and the vertical wall 180 of the leg 178 has a width less than the width of the channel 154 of the leg recess 150 so as to be able to slide along the channel 154, as shown in FIG. 3A. When the handle 108 is positioned with the vertical wall 180 extending through the channel 154, the lower surface 118 of the armboard deck 102 defining the channel 154 is received within the gap 184 of a corresponding leg 178 of the handle 108. Further, the width of the horizontal wall 182 is greater than the width of the channel 154 to prevent the handle 108 from being removed from the armboard deck 102 without sliding the vertical wall 180 out of the channel 154 and back into the insertion hole 152.

Figure 9:
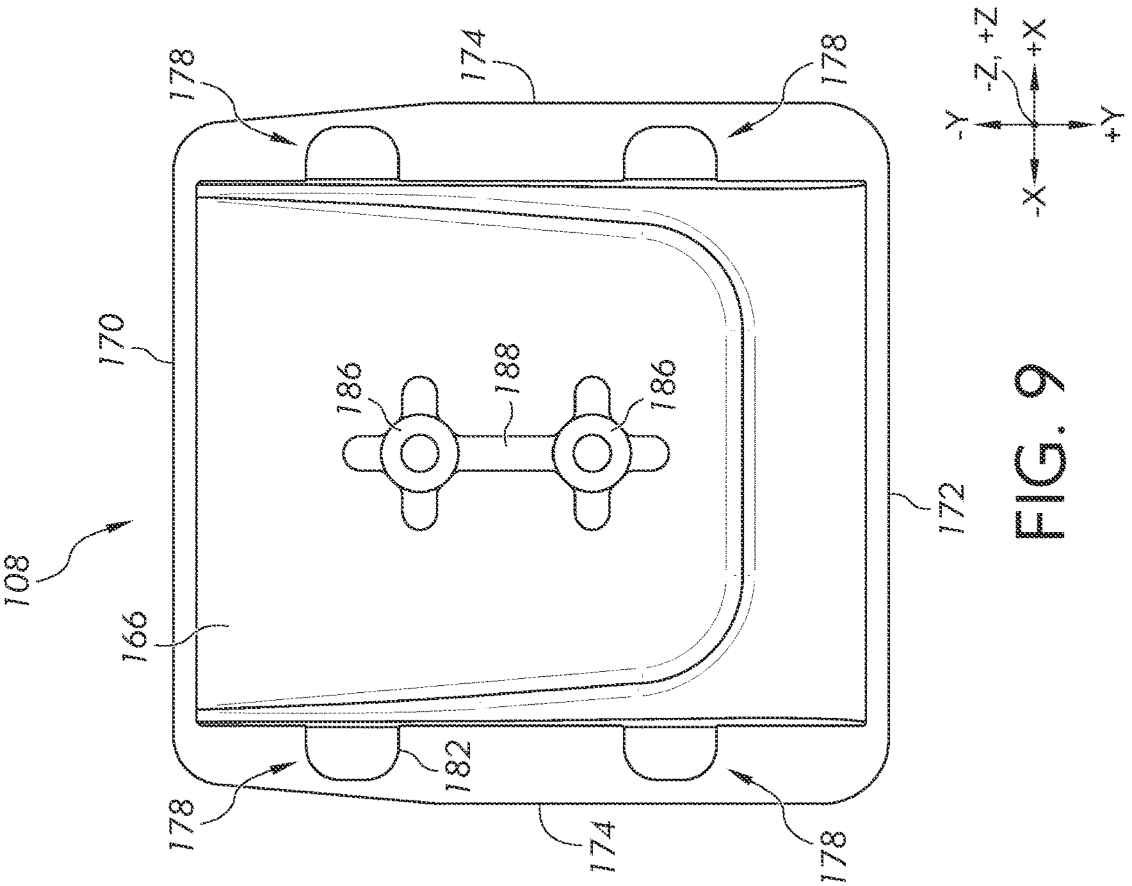
FIG. 9 schematically depicts a top plan view of the handle, according to one or more embodiments shown and described herein.
Figure 8:
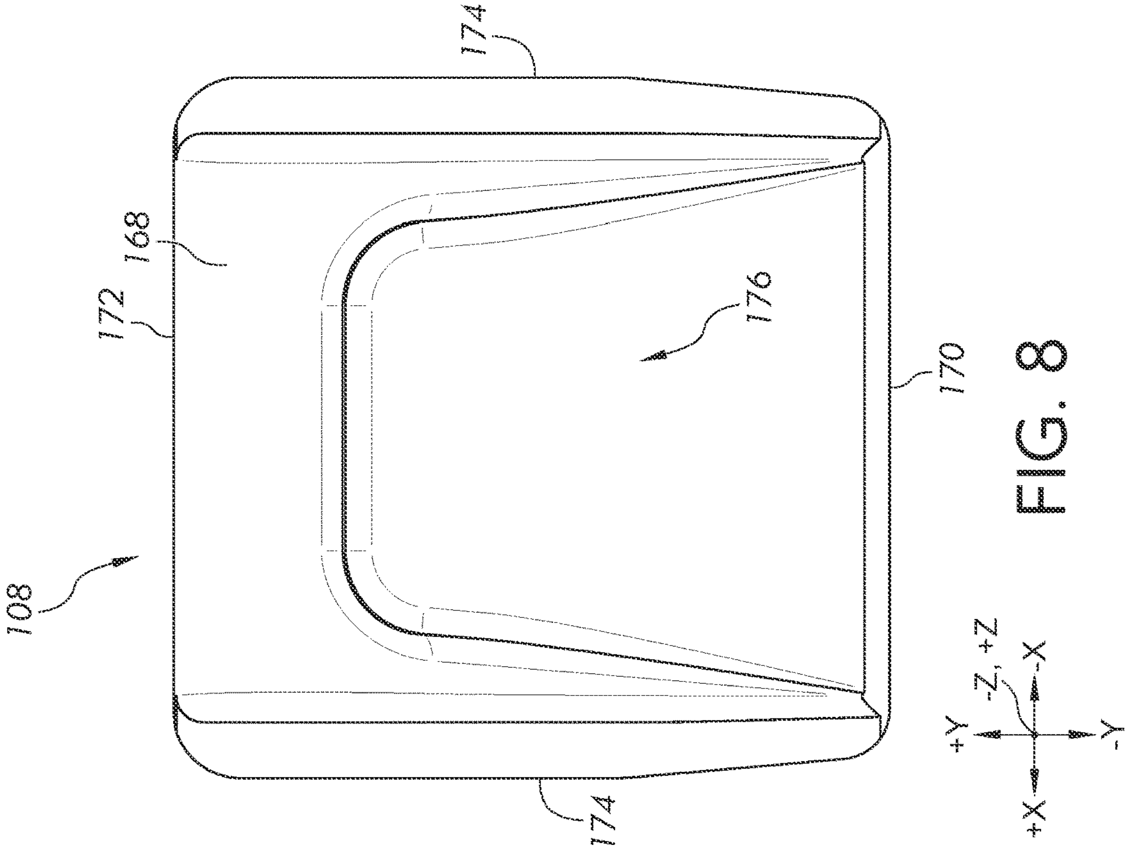
FIG. 8 schematically depicts a bottom plan view of the handle, according to one or more embodiments shown and described herein.
Figure 10:
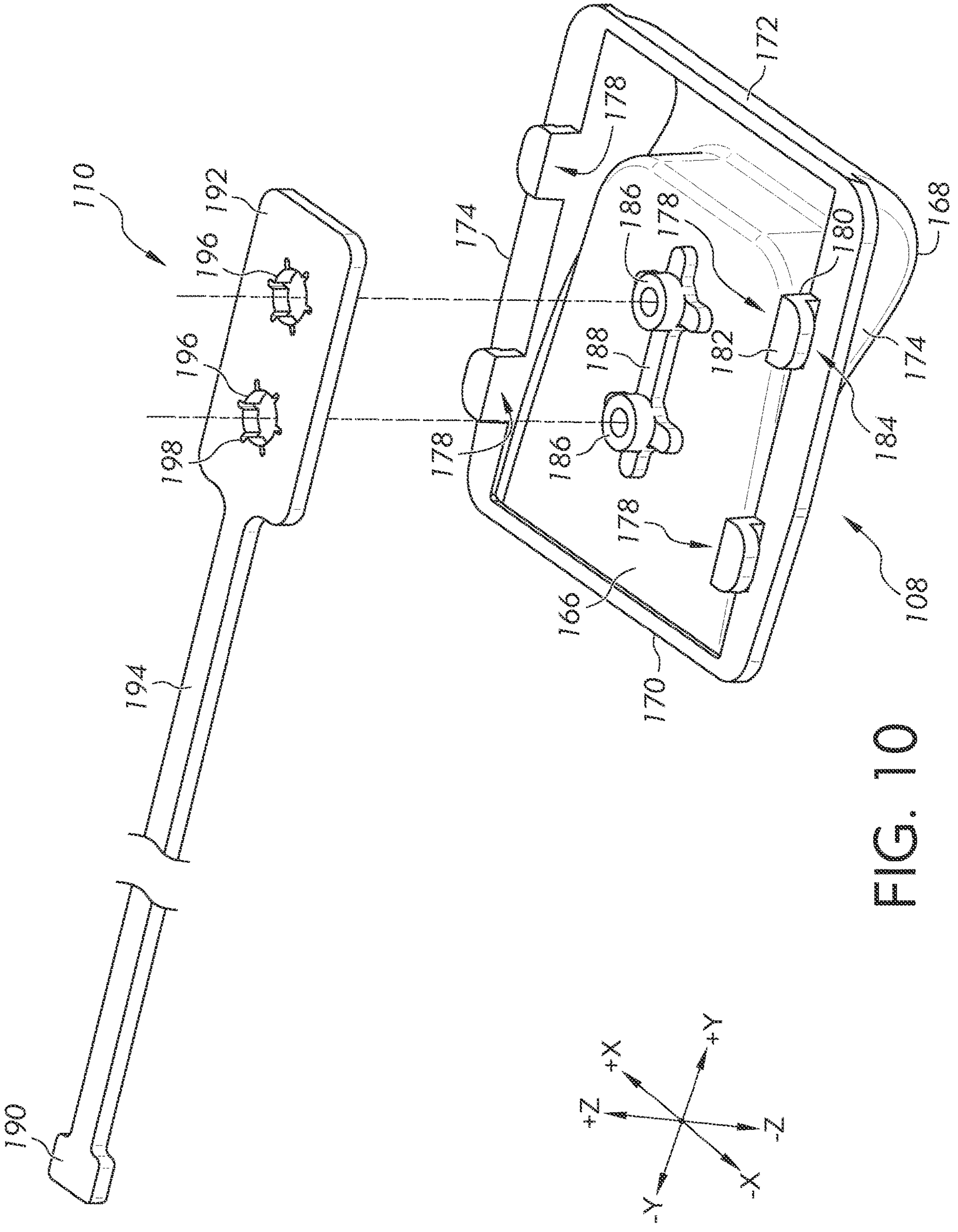
FIG. 10 schematically depicts an exploded perspective view of the handle and a blade of the armboard assembly, according to one or more embodiments shown and described herein.

Referring now to FIGS. 9 and 10, in embodiments, one or more posts 186 extend from the upper surface 166 of the handle 108 to secure the blade 110 thereto, as described herein. As shown, a pair of posts 186 are provided extending from the upper surface 166 of the handle 108 to prevent rotation of the blade 110 relative to the handle 108. Each post 186 may have any suitable geometry such as circular or polygonal. In embodiments in which the post 186 has a polygonal geometry, a single post 186 may be suitable for preventing rotation of the blade 110 relative to the handle 108. In embodiments, a spacer 188 is provided on the upper surface 166 of the handle 108. In embodiments, the spacer 188 is provided where the post 186 extends from the upper surface 166 of the handle 108 to provide a stopping point at which the blade 110 is prevented from being further lowered onto the upper surface 166 of the handle 108. It should be appreciated that the spacer 188 is formed to have a thickness that aligns the blade 110 with the indexing member 112, as discussed herein.

As shown in FIG. 10, the blade 110 is in a spaced apart relation relative to the handle 108. The blade 110 includes a first end portion 190, an opposite second end portion 192, and a body portion 194 extending between and interconnecting the first end portion 190 and the second end portion 192. Each of the first end portion 190, the second end portion 192, and the body portion 194 has a corresponding width extending in the +/−X-axis of the coordinate axes depicted in the drawings. In embodiments, the width of the first end portion 190 of the blade 110 is greater than the width of the body portion 194 of the blade 110. Similarly, in embodiments, the width of the second end portion 192 of the blade 110 is greater than the width of the body portion 194.

One or more holes 196 are formed in the second end portion 192 of the blade 110 having a geometry corresponding to the one or more posts 186 extending from the upper surface 166 of the handle 108. As shown, a pair of holes 196 are formed in the second end portion 192 of the blade 110 with each hole 196 configured to receive a corresponding post 186 of the handle 108 when the blade 110 is lowered onto the upper surface 166 of the handle 108. In embodiments, each hole 196 has a plurality of relief slots 198 extending radially outwardly from the hole 196. The relief slots 198 provide a degree of flexibility to the hole 196 formed in the second end portion 192 of the blade 110 so that the posts 186 may be received within the holes 196 and secured thereto by friction fit. As discussed herein, when the blade 110 is lowered onto the handle 108, the spacer 188 limits the amount that the second end portion 192 of the blade 110 may be lowered onto the upper surface 166 of the handle 108 such that the first end portion 190 of the blade 110 aligns with the indexing member 112 in the +/−Z-axis.

Referring now to FIG. 3C, the indexing member 112 includes a toothed portion 200 having a front end 202, an opposite rear end 204, and a pair of side walls 206 extending between the front end 202 and the rear end 204. The front end 202 of the toothed portion 200 includes a plurality of teeth 208 extending in a direction opposite the rear end 204 of the toothed portion 200. In embodiments, the rear end 204 includes a leg 210 extending proximate one of the side walls 206 in a direction opposite the front end 202 of the toothed portion 200. The leg 210 may include a protrusion 212 formed along a length of the leg 210 and extending inwardly. In embodiments, as shown, the indexing member 112 includes a pair of legs 210 extending from the rear end 204 of the toothed portion 200 proximate corresponding side walls 206 and each leg 210 includes a protrusion 212 extending inwardly toward the opposite leg 210. In embodiments, the toothed portion 200 includes a tab 214 extending from one of the side walls 206 in a direction opposite the other side wall 206. As described in more detail herein, the tab 214 is configured to limit movement of the indexing member 112, and thus the engagement assembly 106, in the first direction D1 and the second direction D2 by coming into contact with the first limiting wall 142 and the second limiting wall 144, respectively. In embodiments, the toothed portion 200 includes a pair of tabs 214 extending from opposite side walls 206 of the toothed portion 200 and in opposite directions of one another.

As discussed herein, the engagement assembly 106 also includes one or more biasing members 114 such as, for example, a spring. The biasing member 114 is positioned within the indexing portion 124 of the cavity 120 between the indexing member 112 and the transverse wall 146 to bias the indexing member 112, and thus the engagement assembly 106, in the first direction D1 toward the engaged position. More particularly, the biasing member 114 may extend between the protrusion 212 and the transverse wall 146, when provided. When a pair of legs 210 are provided on the indexing member 112 and each leg 210 includes a protrusion 212, a biasing member 114 may be provided and extend between the transverse wall 146 and each protrusion 212. However, it should be appreciated that the position of the one or more biasing members 114 is not limited to those positions discussed herein and other suitable positions such as, for example, within the end portion 128 of the cavity 120, are within the scope of the present disclosure.

Figure 11:
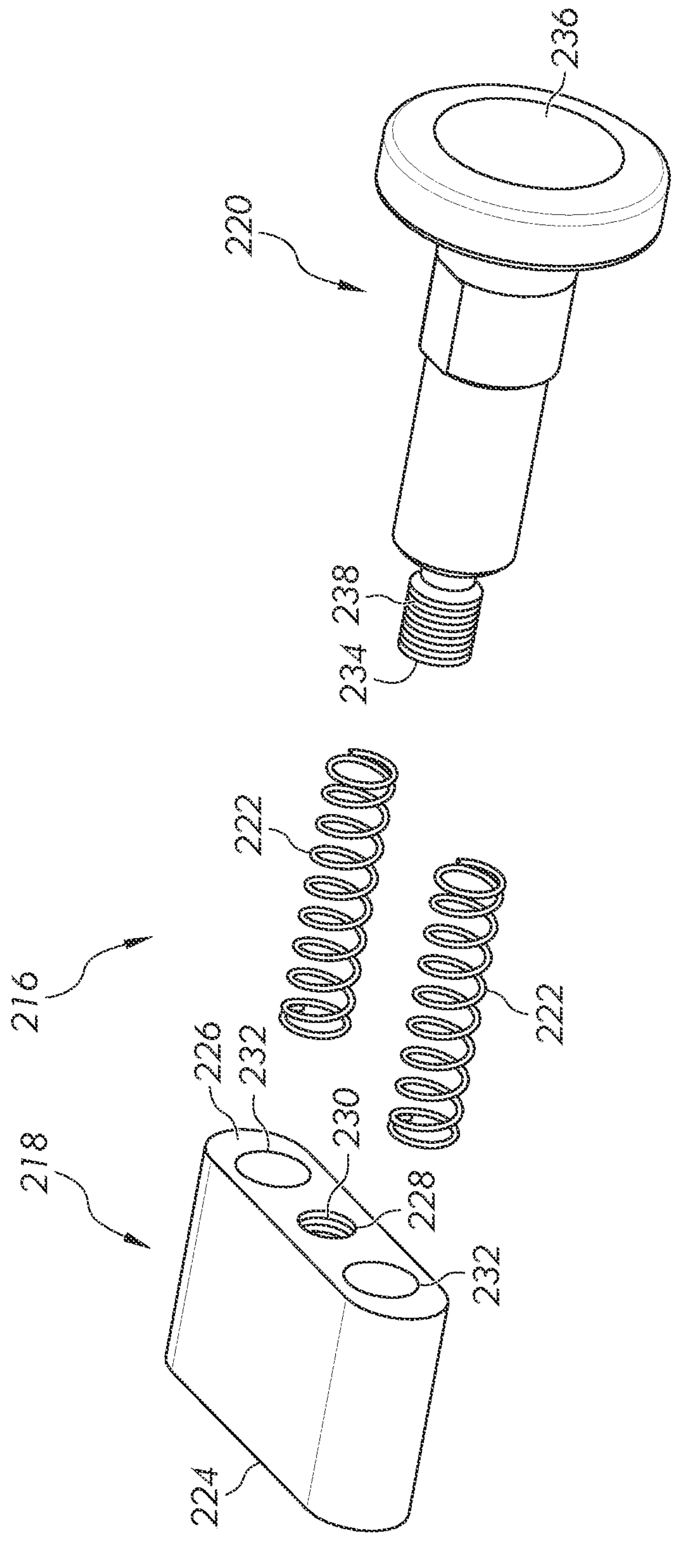
FIG. 11 schematically depicts an exploded perspective view of a plunger assembly of the armboard assembly, according to one or more embodiments shown and described herein.

Referring now to FIG. 11, a plunger assembly 216 of the armboard mount 104 is illustrated. The plunger assembly 216 includes a plunger 218, a knob 220, and one or more biasing members 222 such as, for example, a spring. The plunger 218 has a free outer end 224 and an opposite inner end 226. In embodiments, the plunger 218 includes a knob opening 228 for receiving a portion of the knob 220 and securing the knob 220 thereto. The knob opening 228 may include threads 230 for threadably securing the plunger 218 to the knob 220. In embodiments, the plunger 218 has a biasing opening 232 for receiving an end of a corresponding biasing member 222. As shown in FIG. 11, a pair of biasing openings 232 are formed in the inner end 226 of the plunger 218 where each biasing opening 232 receives a corresponding biasing member 222. However, in other embodiments, the plunger 218 may not have any biasing openings 232 and the biasing members 222 may abut against the inner end 226 of the plunger 218 itself. The knob 220 includes an engaging end 234, which extends through the knob opening 228 of the plunger 218, and an opposite free end 236. As such, the engaging end 234 of the knob 220 may include threads 238 to threadably engage the threaded knob opening 228 of the plunger 218.

Figure 12:
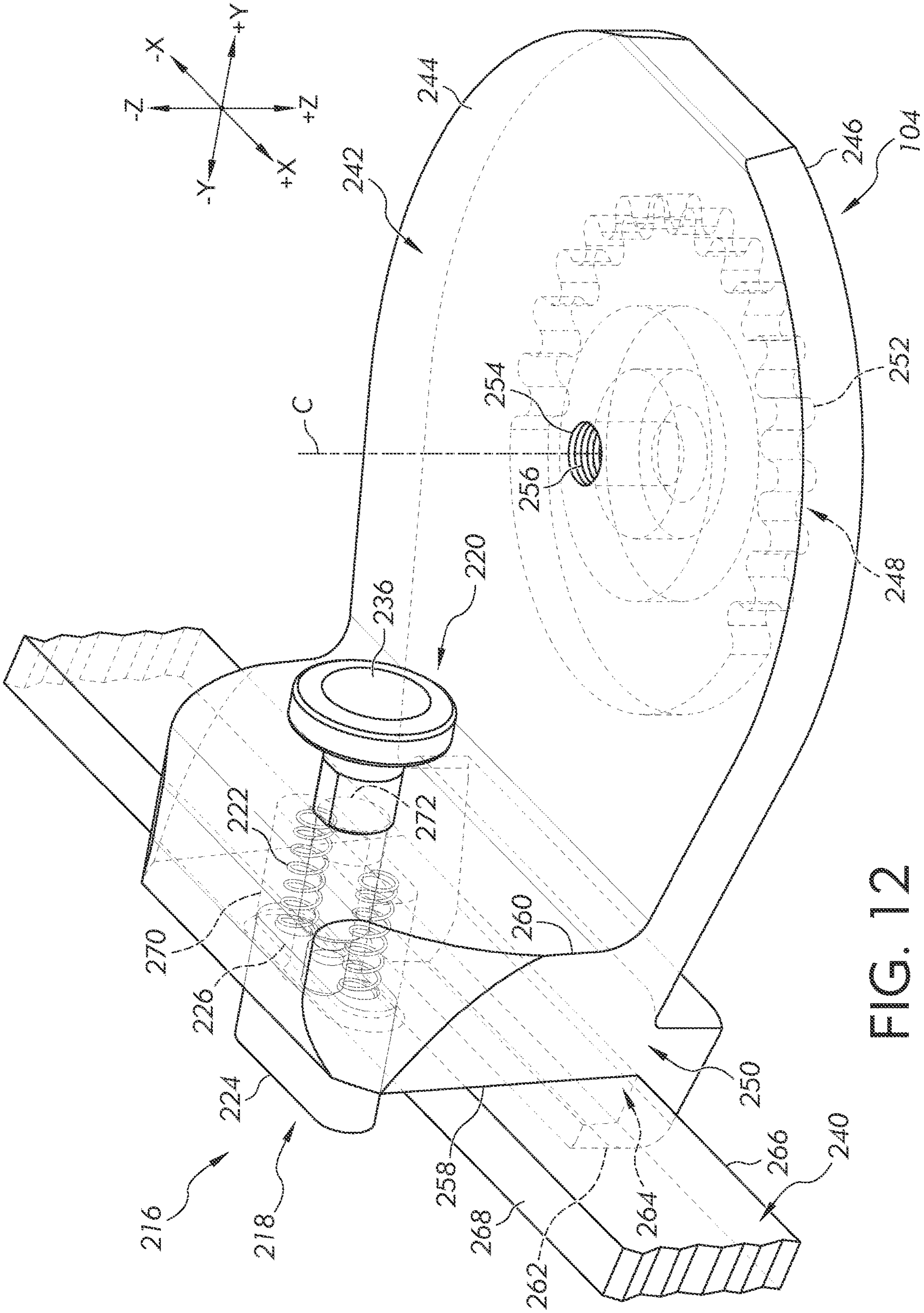
FIG. 12 schematically depicts a partially transparent bottom perspective view of the plunger assembly and an armboard mount of the armboard assembly mounted to a mounting structure, according to one or more embodiments shown and described herein.

Referring now to FIG. 12, an underside view of the armboard mount 104 is shown attached to a mounting structure 240 and separate from the armboard deck 102. It should be appreciated that the mounting structure 240 may be any suitable structure to which the armboard assembly 100 may be attached such as, for example, a side rail or portion of a surgical table, an X-ray table, a medical transport, a chair, a bed, and the like. The armboard mount 104 includes a base plate 242 having a lower surface 244 and an opposite upper surface 246, a wheel 248 extending from the upper surface 246 of the base plate 242, and a mounting block 250 extending from the base plate 242. The plunger assembly 216 is shown extending through the mounting block 250.

The wheel 248 includes a plurality of teeth 252 extending radially outwardly from a central axis C. The teeth 252 of the wheel 248 are configured to mate with the teeth 208 of the indexing member 112 (FIG. 3A) when the wheel 248 is positioned within the outer receiving area 134 of the mount portion 122 of the cavity 120 and the engagement assembly 106 is in the engaged position, thereby preventing rotation of the armboard deck 102 relative to the armboard mount 104 about the central axis C. The central axis C extends axially through an aperture 254 formed in the wheel 248 and the base plate 242. In embodiments, the aperture 254 includes threads 256 such that the fastener 138 (FIG. 3A) engages the aperture 254 to rotatably secure the armboard mount 104 to the armboard deck 102, as discussed herein. Thus, the armboard mount 104 rotates about the central axis C relative to the armboard deck 102 when the engagement assembly 106 is in the disengaged position, i.e., the teeth 208 of the indexing member 112 do not mate with the teeth 252 of the wheel 248. In embodiments, at least the base plate 242 and the wheel 248 form a one-piece, monolithic structure. The mounting block 250 may also form a one-piece, monolithic structure with the base plate 242 and the wheel 248.

The mounting block 250 of the armboard mount 104 extends from the base plate 242 and has a front surface 258 and an opposite rear surface 260. A retaining lip 262 extends from the front surface 258 of the mounting block 250 and has a substantially L-shaped geometry. The retaining lip 262 and the front surface 258 of the mounting block 250 cooperate to define a mounting channel 264 for receiving a top edge 266 of the mounting structure 240. A recess 270 is formed in the front surface 258 of the mounting block 250 extending toward the rear surface 260 of the mounting block 250 for at least partially receiving the plunger assembly 216. Specifically, the recess 270 receives the one or more biasing members 222 and a varying amount of the plunger 218 based on a state of the knob 220. An opening 272 is formed in the rear surface 260 of the mounting block 250 and terminates at the recess 270. The knob 220 of the plunger assembly 216 extends through the opening 272 and into the recess 270 to engage the plunger 218, as described herein. Further, the one or more biasing members 222 are provided within the recess 270 and extend between the inner end 226 of the plunger 218 and an interior wall of the mounting block 250 defining the recess 270.

As such, the plunger assembly 216 is operable between an extended position and a retracted position relative to the mounting block 250. When in the extended position, the plunger 218 is positioned opposite the retaining lip 262 such that the mounting structure 240 may be positioned between the plunger 218 and the retaining lip 262 to secure the armboard mount 104 on the mounting structure 240. Alternatively, when in the retracted position, the plunger 218 is drawn into the recess 270 and out of contact with a bottom edge 268 of the mounting structure 240 such that the armboard mount 104 may be removed from engagement with the mounting structure 240. To maintain a linear position of the plunger assembly 216 relative to the mounting block 250, the inner end 226 of the plunger 218 may be positioned within the recess 270 when in the extended position. Alternatively or in addition to, the opening 272 of the mounting block 250 may be dimensioned to provide a constant contact fit with a portion of the knob 220 extending therethrough and maintain the lateral position of the plunger assembly 216.

Specifically, pulling the free end 236 of the knob 220 in the second direction D2 draws the plunger 218 further into the recess 270 formed in the mounting block 250, thereby positioning the plunger assembly 216 in the retracted position. This causes the plunger 218 to move out of contact with the bottom edge 268 of the mounting structure 240 and permit removal of the armboard mount 104 from the mounting structure 240. When in the retracted position, the biasing members 222 are compressed between the mounting block 250 and the plunger 218 to bias the plunger 218 toward the first direction D1. Thus, when the free end 236 of the knob 220 is released, the biasing members 222 expand to push the plunger 218 in the first direction D1 and out of the recess 270, thereby positioning the plunger assembly 216 back in the extended position. As the plunger 218 extends from the recess 270, the mounting structure 240 is secured between the retaining lip 262 and the plunger 218 to secure the armboard mount 104 onto the mounting structure 240.

Figure 13:
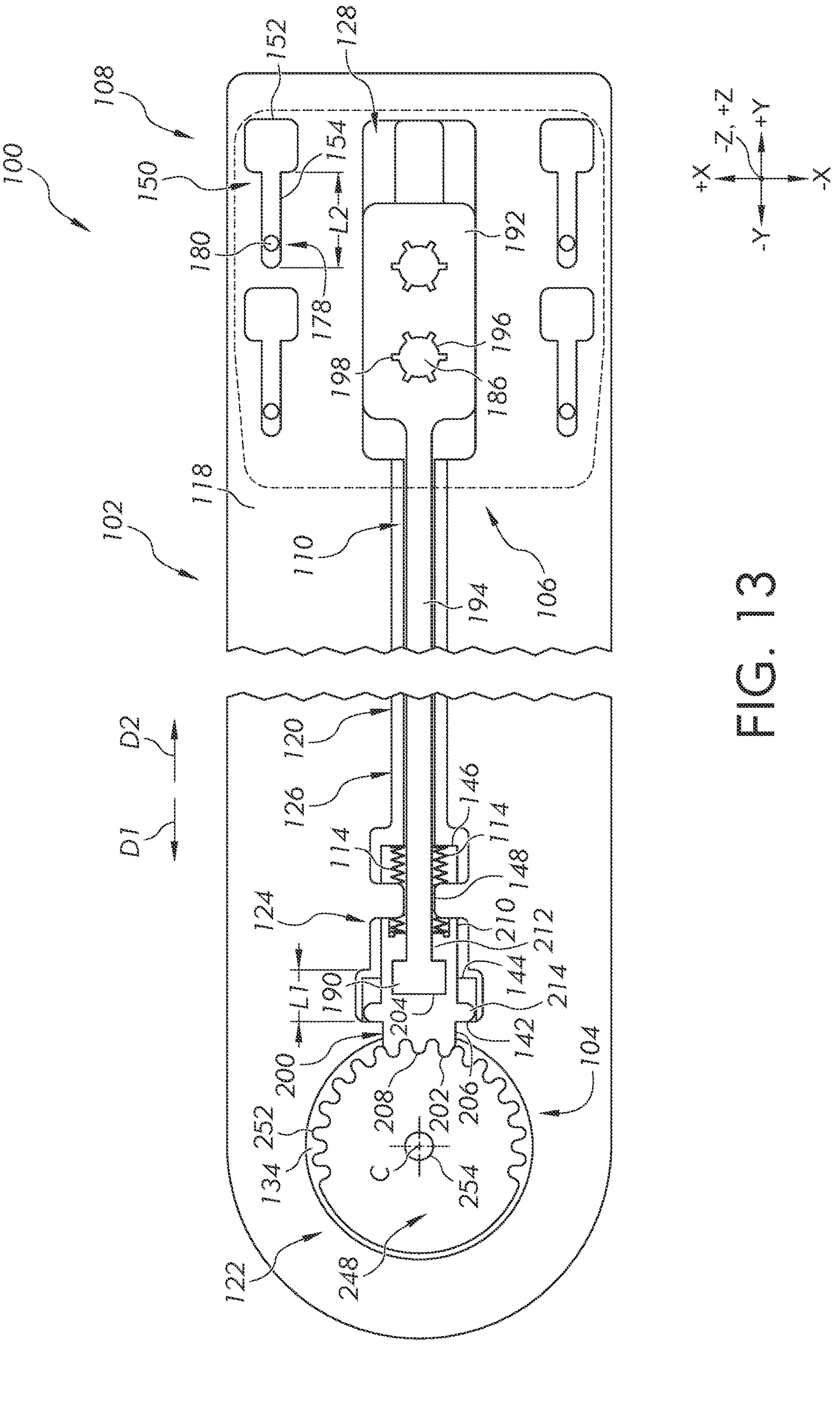
FIG. 13 schematically depicts a partial top plan view of the armboard assembly including an engagement assembly in an engaged position, according to one or more embodiments shown and described herein.
Figure 14:
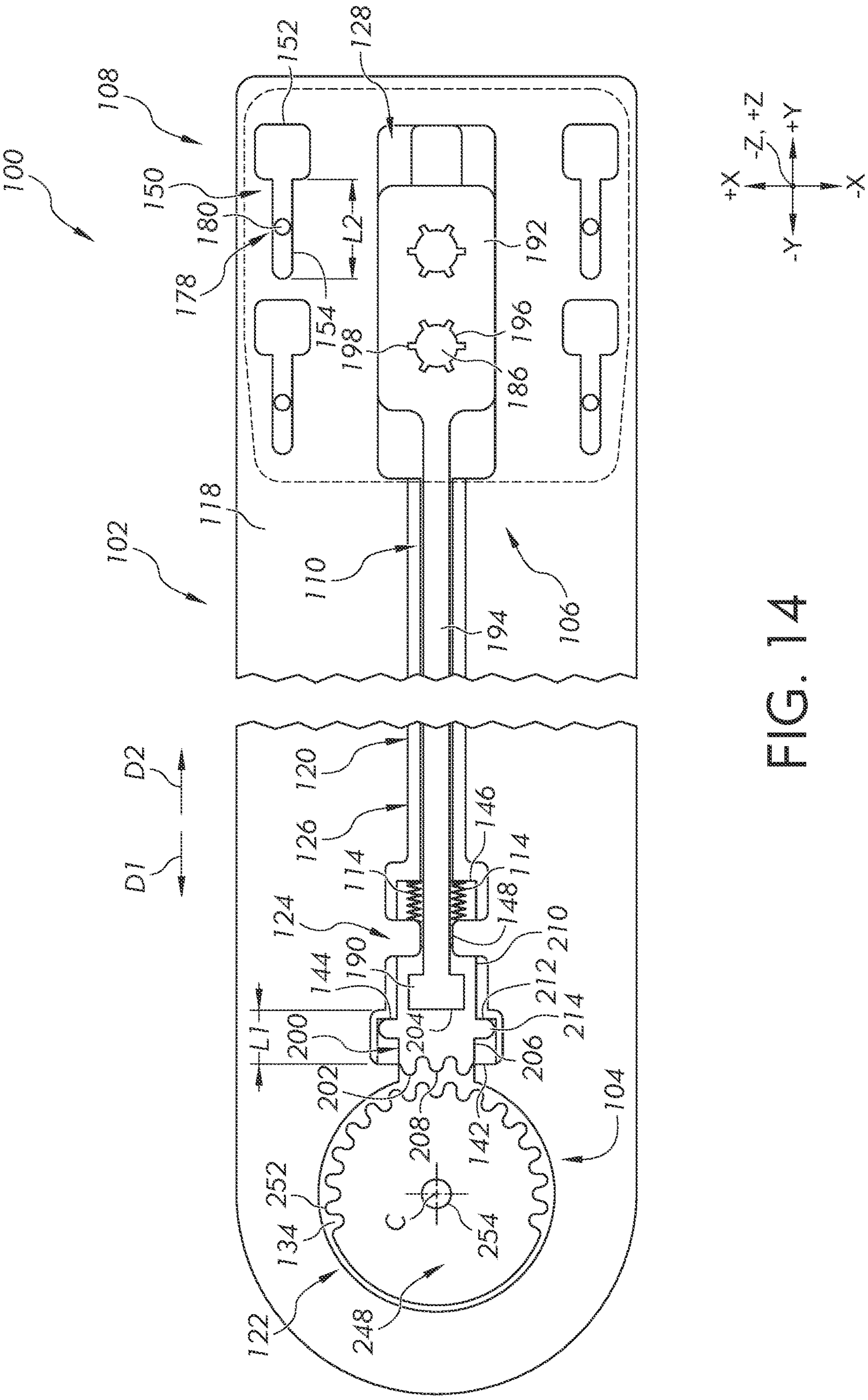
FIG. 14 schematically depicts a partial top plan view of the armboard assembly including the engagement assembly in a disengaged position, according to one or more embodiments shown and described herein.

Referring now to FIGS. 13 and 14, the engagement assembly 106 is shown within the cavity 120 of the armboard deck 102 and positioned in the engaged position (FIG. 13) and the disengaged position (FIG. 14). In FIGS. 13 and 14, certain portions of the handle 108 and the armboard mount 104 are transparent or otherwise not illustrated to better demonstrate the relationship of the engagement assembly 106 with the armboard deck 102 and the wheel 248 of the armboard mount 104.

To position the engagement assembly 106 within the cavity 120 of the armboard deck 102, the indexing member 112 is initially positioned within the indexing portion 124 of the cavity 120. Thereafter, the handle 108, with the blade 110 attached to the upper surface 166 of the handle 108, is positioned onto the lower surface 118 of the armboard deck 102 such that each of the legs 178 of the handle 108 extend through the insertion hole 152 of corresponding leg recesses 150 formed in the lower surface 118 of the armboard deck 102. The handle 108 is then moved in the first direction D1 such that the vertical wall 180 of each leg 178 engages the channel 154 of each leg recess 150. Once the vertical wall 180 is positioned within the channel 154, the horizontal wall 182 of each leg 178 prevents the removal of the handle 108 from the armboard deck 102 due to the width of the horizontal wall 182 being greater than the width of the channel 154. With the handle 108 moved in the first direction D1 toward the mount portion 122 of the cavity 120, the first end portion 190 of the blade 110 is positioned within an area of the indexing member 112 defined by the rear end 204 of the toothed portion 200, the one or more side walls 206, and the protrusion 212 extending from each of the one or more side walls 206. Thus, movement of the handle 108 and the blade 110 fixed thereto in the second direction D2 draws the indexing member 112 in the second direction D2 as well.

Now, operation of the engagement assembly 106 between the engaged position and the disengaged position is described in more detail. Specifically, with the engagement assembly 106 in the engaged position, as shown in FIG. 13, the engagement assembly 106 is biased in the first direction D1 by the one or more biasing members 114 such that the teeth 208 of the indexing member 112 engage the teeth 252 of the wheel 248 of the armboard mount 104. When in the engaged position, the tab 214 of the indexing member 112 contacts the first limiting wall 142, thereby preventing further movement of the engagement assembly 106 in the first direction D1. Additionally, when in the engaged position, the legs 178 of the handle 108, specifically the vertical wall 180 of each leg 178, extends through the channel 154 of a corresponding leg recess 150.

To permit the armboard deck 102 to be rotated relative to the armboard mount 104, the engagement assembly 106 is moved into the disengaged position, as shown in FIG. 14. Specifically, the engagement assembly 106 is moved into the disengaged position by pulling the handle 108 in the second direction D2. As the blade 110 is fixed to the handle 108 and the first end portion 190 of the blade 110 is received within the indexing member 112, pulling the handle 108 in the second direction D2 draws the blade 110 and the indexing member 112 in the second direction D2 as well. As the indexing member 112 is drawn in the second direction D2, the teeth 208 of the indexing member 112 disengage the teeth 252 of the wheel 248 of the armboard mount 104, which permits the armboard deck 102 to freely rotate relative to the armboard mount 104. When in the disengaged position, the tab 214 of the indexing member 112 contacts the second limiting wall 144, thereby preventing further movement of the engagement assembly 106 in the second direction D2.

As noted herein, it should be appreciated that a distance between the first limiting wall 142 and the second limiting wall 144, which defines the indexing length L1, is less than or equal to the channel length L2 of the channel 154 of each leg recess 150. Therefore, even with the engagement assembly 106 in the disengaged position, the legs 178 of the handle 108 are still received within the channel 154, rather than extending into the insertion hole 152. This prevents the handle 108 from being removed from the armboard deck 102 when in the disengaged position.

From the above, it is to be appreciated that defined herein are armboard assemblies that support and permit rotation of a limb, such as an arm, during a medical procedure. The armboard assemblies disclosed herein include an armboard deck including a cavity formed in a lower surface of the armboard deck, an armboard mount including a plurality of radially extending teeth positioned within a mount portion of the cavity, and an engagement assembly movable relative to the armboard deck between an engaged position to engage the plurality of teeth of the armboard mount and a disengaged position to disengage the plurality of teeth of the armboard mount. The armboard mount prevents debris from entering the cavity of the armboard deck. Further, the engagement assembly includes a handle configured to receive one or more fingers of a user to facilitate positioning the engagement assembly out of the engaged position and into the disengaged position.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An armboard assembly comprising:
- an armboard deck comprising a cavity formed in a lower surface of the armboard deck;
- an armboard mount comprising a plurality of radially extending teeth positioned within a mount portion of the cavity; and
- an engagement assembly movable relative to the armboard deck between an engaged position to engage the plurality of teeth of the armboard mount and a disengaged position to disengage the plurality of teeth of the armboard mount, the engagement assembly comprising:
  - a handle including one or more legs extending from an upper surface of the handle, the one or more legs slidably engaging a leg recess formed in the armboard deck, the leg recess including an insertion hole and a channel extending from the insertion hole toward the armboard mount; and
  - an indexing member positioned within the cavity of the armboard deck and coupled to the handle,
- wherein the indexing member limits movement of the engagement assembly toward the disengaged position such that the one or more legs of the handle is maintained within the channel of the leg recess and does not extend into the insertion hole.

2. The armboard assembly of claim 1, wherein a length of travel of the indexing member in the cavity is less than or equal to a length of the channel.

3. The armboard assembly of claim 1, wherein the one or more legs of the handle comprises:
- a vertical wall extending from the upper surface of the handle; and
- a horizontal wall extending from an end of the vertical wall opposite the upper surface of the handle,
- wherein a gap is defined between the upper surface of the handle and a lower surface of the horizontal wall.

4. The armboard assembly of claim 3, wherein the handle further comprises:
- a plurality of legs extending from the upper surface of the handle, each of the plurality of legs being received within a corresponding leg recess formed in the lower surface of the armboard deck.

5. The armboard assembly of claim 1, further comprising:
- a blade including a first end portion engaging the indexing member and an opposite second end portion secured to the upper surface of the handle, the blade positioned within the cavity of the armboard deck.

6. The armboard assembly of claim 1, wherein the armboard mount further comprises:
- a base plate positioned on the lower surface of the armboard deck; and
- a wheel extending from an upper surface of the base plate, the wheel including the plurality of teeth,
- wherein the base plate and the wheel form a one-piece, monolithic structure.

7. The armboard assembly of claim 1, wherein the armboard deck further comprises:
- a first limiting wall; and
- a second limiting wall,
- wherein the indexing member contacts the first limiting wall when the engagement assembly is in the engaged position and the indexing member contacts the second limiting wall when the engagement assembly is in the disengaged position to limit movement of the indexing member within the cavity between the engaged position and the disengaged position.

8. The armboard assembly of claim 7, further comprising:
- a biasing member positioned within the cavity, the biasing member extending between the indexing member and a transverse wall to bias the indexing member toward the mount portion of the cavity.

9. The armboard assembly of claim 7, further comprising:
- a third limiting wall extending from the lower surface of the armboard deck and at least partially across the cavity.

10. An armboard assembly comprising:
- an armboard deck including a cavity formed in a lower surface of the armboard deck;
- an armboard mount including a plurality of radially extending teeth positioned within a mount portion of the cavity; and
- an engagement assembly movable relative to the armboard deck between an engaged position to engage the plurality of teeth of the armboard mount and a disengaged position to disengage the plurality of teeth of the armboard mount, the engagement assembly comprising:
  - a handle slidably movable along the lower surface of the armboard deck;
  - a blade including a first end portion and an opposite second end portion attached to the handle, the blade positioned within the cavity; and
  - an indexing member positioned within the cavity of the armboard deck, the first end portion of the blade engaging the indexing member in each of the engaged position and the disengaged position.

11. The armboard assembly of claim 10, wherein:
- the handle comprises one or more posts extending from an upper surface of the handle; and
- the first end portion of the blade comprises one or more holes formed therein, each of the one or more holes configured to receive a corresponding post of the handle.

12. The armboard assembly of claim 11, wherein each of the one or more holes comprises a plurality of radially outwardly extending relief slots.

13. The armboard assembly of claim 10, wherein the indexing member comprises one or more legs, the first end portion of the blade received within an area at least partially defined by the one or more legs of the indexing member.

14. The armboard assembly of claim 10, further comprising a biasing member positioned within the cavity, the biasing member extending between the indexing member and a transverse wall within the cavity to bias the indexing member toward the mount portion of the cavity.

15. The armboard assembly of claim 10, further comprising a blade cap positioned at the lower surface of the armboard deck to conceal the blade and the indexing member within the cavity of the armboard deck.

16. A method for operating an armboard assembly, the method comprising:

biasing an engagement assembly in a first direction toward an engaged position relative to an armboard deck such that an indexing member of the engagement assembly engages a plurality of teeth of an armboard mount provided within a cavity of the armboard deck;

pulling a handle of the engagement assembly to move the engagement assembly in an opposite second direction toward a disengaged position such that the indexing member disengages the plurality of teeth of the armboard mount, the handle comprising one or more legs extending into a corresponding leg recess formed in the armboard deck, the leg recess including an insertion hole and a channel extending from the insertion hole toward the armboard mount; and limiting, by the indexing member, a distance in which the handle may be pulled in the second direction toward the disengaged position to maintain the one or more legs of the handle within the channel of the leg recess and prevent the one or more legs of the handle from extending into the insertion hole.

17. The method of claim 16, wherein the biasing the engagement assembly toward the first direction comprises expanding a biasing member between the indexing member and a transverse wall formed in the cavity.

18. The method of claim 17, wherein the pulling the handle causes the biasing member to compress between the indexing member and the transverse wall.

19. The method of claim 16, wherein:

a lower surface of the armboard deck is received within a gap defined by the lower surface of the armboard deck and a horizontal wall of the one or more legs of the handle extending within the armboard deck; and the armboard deck slides within the gap as the engagement assembly moves between the engaged position and the disengaged position.

20. The method of claim 16, wherein the armboard mount comprises:

a base plate positioned on a lower surface of the armboard deck; and a wheel including the plurality of teeth, wherein the base plate and the plurality of teeth form a one-piece, monolithic structure.

* * * * *